United States Patent
Kaneko et al.

(10) Patent No.: US 8,652,432 B2
(45) Date of Patent: Feb. 18, 2014

(54) METHOD FOR PRODUCING POROUS SILICA MATERIAL

(71) Applicant: Panasonic Corporation, Osaka (JP)

(72) Inventors: Yuriko Kaneko, Nara (JP); Takuya Iwamoto, Osaka (JP); Ushio Sangawa, Nara (JP); Masahiko Hashimoto, Osaka (JP); Norihisa Mino, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/965,526

(22) Filed: Aug. 13, 2013

(65) Prior Publication Data

US 2013/0330262 A1 Dec. 12, 2013

Related U.S. Application Data

(63) Continuation of application No. PCT/JP2012/003387, filed on May 24, 2012.

(30) Foreign Application Priority Data

Jun. 17, 2011 (JP) .................. 2011-135246

(51) Int. Cl.
    *C01B 33/12* (2006.01)
(52) U.S. Cl.
    USPC .......................................... 423/338; 423/335
(58) Field of Classification Search
    USPC .................................. 423/335, 338
    See application file for complete search history.

(56) References Cited

U.S. PATENT DOCUMENTS

| 7,345,000 B2 * | 3/2008 | Kevwitch et al. ............. 438/758 |
| 2010/0021712 A1 | 1/2010 | Katayama |

FOREIGN PATENT DOCUMENTS

| JP | 2004-131343 A | 4/2004 |
| JP | 2007-084396 A | 4/2007 |
| JP | 2011-098880 A | 5/2011 |
| WO | WO 2008/129901 A1 | 10/2008 |

OTHER PUBLICATIONS

International Search Report for corresponding International Application No. PCT/JP2012/003387 mailed Aug. 14, 2012.
J. Fricke et al., "Aerogels: production, characterization, and applications" Thin Solid Films 297 (1997) 212-223.
Hidetomo Nagahara et al., "Development of High-Sensitivity Ultrasonic Transducer in Air with Nanofoam Material," Japanese Journal of Applied Physics, vol. 44, No. 6B, pp. 4485-4489, 2005.

* cited by examiner

*Primary Examiner* — Anthony J Zimmer
(74) *Attorney, Agent, or Firm* — Renner, Otto, Boisselle & Sklar, LLP

(57) ABSTRACT

A method of producing a porous silica material includes: preparing a raw material solution containing silicon alkoxides including diisobutyldimethoxysilane and tetramethoxysilane in such a mass ratio that a mass of the diisobutyldimethoxysilane is 0.25 or more and 1 or less per mass of the tetramethoxysilane, and a solvent; obtaining a wet gel by adding, to the raw material solution, an aqueous solution containing a catalyst for promoting hydrolysis and condensation polymerization of the silicon alkoxides, the aqueous solution having a pH of 8.9 or more and 11.3 or less; washing the wet gel; and drying the washed wet gel under supercritical conditions.

10 Claims, 8 Drawing Sheets

METHOD FOR PRODUCING POROUS SILICA MATERIAL

This is a continuation of International Application No. PCT/JP2012/003387, with an international filing date of May 24, 2012, which claims priority of Japanese Patent Application No. 2011-135246, filed on Jun. 17, 2011, the contents of which are hereby incorporated by reference.

BACKGROUND

1. Technical Field

The present application relates to a method of producing a porous silica material.

2. Description of the Related Art

A low-density porous silica material, generally referred to as silica aerogel, has many fine pores and is formed of voids by 90% or more of its volume. In addition, its skeleton is formed of spherical silica fine particles each having a size of about several nanometers to several tens of nanometers that are connected together. The porous silica material has a low density and a low refractive index. In addition, a speed of sound propagating in the porous silica material (hereinafter referred to as sound speed of the porous silica material) is lower than the sound speed in the air, i.e., 340 m/s. Accordingly, the porous silica material has been attracting attention as an acoustic propagation medium for use in various acoustic devices. For example, Non-patent Document No. 1 (Hidetomo Nagahara, Takashi Hashida, Masa-aki Suzuki, Masahiko Hashimoto, "Development of High-Sensitivity Ultrasonic Transducer in Air with Nanofoam Material," Japanese Journal of Applied Physics, Vol. 44, No. 6B, pp. 4485-4489, 2005) discloses that, through utilization of such property of the porous silica material as to have a low sound speed, the porous silica material is useful as an acoustic matching layer for efficiently incorporating sound waves in the air into an ultrasonic transducer.

In order to improve performance of the porous silica material as the acoustic matching layer, it is necessary to reduce an acoustic impedance of the porous silica material. For this purpose, it is necessary to further reduce the sound speed of the porous silica material. Non-patent Document No. 1 discloses a relationship between a density and sound speed of the porous silica material. As shown in FIG. 10, when the density is reduced, the sound speed also reduces. According to FIG. 10, when the density is reduced to about 70 kg/cm$^3$, the sound speed reduces to about 75 m/s.

Non-patent Document No. 2 (J. Fricke, T. Tillotson "Aerogels: production, characterization, and applications" Thin Solid Films 297 (1997) 212-223) also discloses, as shown in FIG. 11, a relationship between a density and sound speed of the porous silica material. When the porous silica material is placed in the atmosphere, in the case where the density falls within the range of more than about 50 kg/cm$^3$, the sound speed reduces when the density is reduced, as in FIG. 10. However, in the case where the density falls within the range of less than about 50 kg/cm$^3$, the sound speed starts increasing when the density is reduced. The sound speed when the porous silica material is placed in a vacuum reduces with density, and hence the fact that the sound speed starts increasing in the atmosphere is probably attributable to an influence of the air. According to FIG. 11, when the porous silica material is placed in the atmosphere, the lowest sound speed is about 100 m/s.

The porous silica material is synthesized with use of a silicon alkoxide (alkoxysilane) as a raw material. Tetramethoxysilane (hereinafter abbreviated as TMOS) represented by the following chemical formula (1) is generally used as the silicon alkoxide. First, TMOS is mixed with a solvent such as ethanol to manufacture a raw material solution.

[Chem. 1]

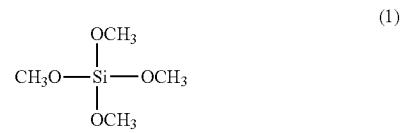
(1)

Next, an aqueous solution containing a catalyst is added to the raw material solution to cause hydrolysis and condensation polymerization reactions, to thereby generate a wet gel. After that, a liquid in the wet gel is replaced with a gas (dried). Thus, the porous silica material is obtained.

When the liquid in the wet gel is replaced with a gas, if a tensile stress based on a surface tension of the liquid remaining in the fine pores exceeds strength of the gel, its gel structure is destroyed. To prevent this, supercritical drying is often used in a step of drying the wet gel. In addition, a porous silica material that degrades with time to only an extremely small degree can be obtained by subjecting the gel to hydrophobizing treatment.

SUMMARY

The inventors of the present application have made detailed studies on a method of producing a porous silica material having a low sound speed. As a result, the inventors have found that it is in some cases difficult to stably produce a porous silica material having a low sound speed by a conventional synthesis method.

One non-limiting and exemplary embodiment of the present application provides a method of producing a porous silica material by which a porous silica material having a low sound speed can be stably produced.

A method of producing a porous silica material according to one exemplary embodiment of the present invention includes: preparing a raw material solution containing silicon alkoxides including diisobutyldimethoxysilane and tetramethoxysilane in such a mass ratio that a mass of the diisobutyldimethoxysilane is 0.25 or more and 1 or less per mass of the tetramethoxysilane, and a solvent; obtaining a wet gel by adding, to the raw material solution, an aqueous solution containing a catalyst for promoting hydrolysis and condensation polymerization of the silicon alkoxides, the aqueous solution having a pH of 8.9 or more and 11.3 or less; washing the wet gel; and drying the washed wet gel under supercritical conditions.

According to the method of producing a porous silica material according to the one exemplary embodiment of the present invention, a porous silica material having a given low sound speed can be stably produced.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1:
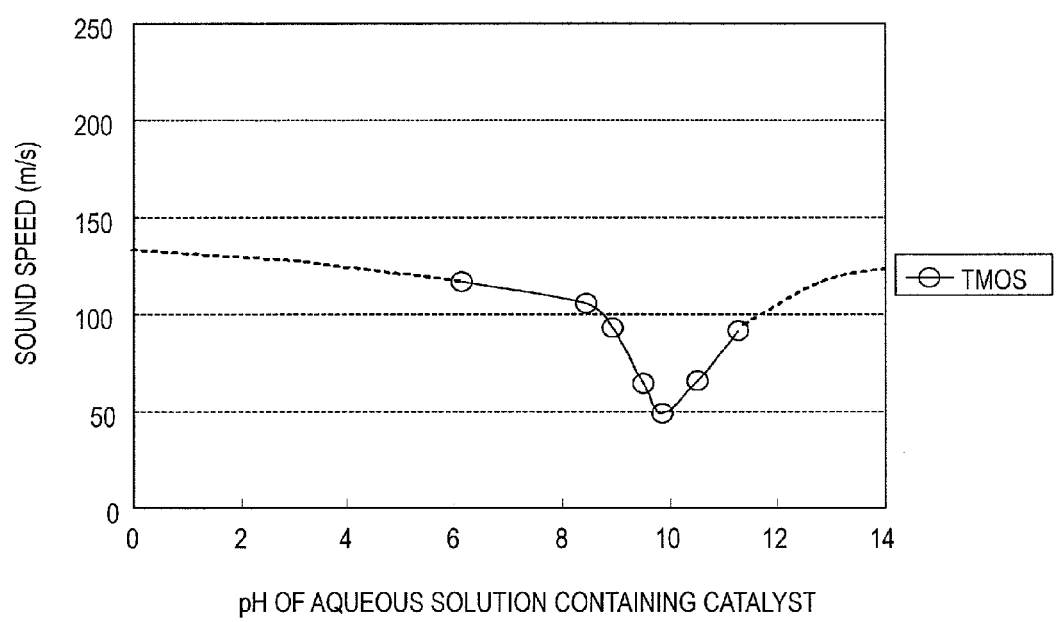
FIG. 1 is a graph showing a relationship between the sound speed of a porous silica material manufactured with use of TMOS and the pH of an aqueous solution containing a catalyst for hydrolysis and dehydration-condensation reactions.

The inventors of the present application have made detailed studies on a method of producing a porous silica material having a low sound speed. As a result, the inventors have found that there is a close relationship between the pH of an aqueous solution containing a catalyst used for subjecting a silicon alkoxide to hydrolysis and condensation polymerization and the sound speed of a manufactured porous silica material. FIG. 1 shows the relationship between the pH of the aqueous solution containing the catalyst added to a raw material solution of TMOS for hydrolysis and condensation polymerization reactions, and the sound speed of the manufactured porous silica material. According to FIG. 1, when the pH of the aqueous solution containing the catalyst becomes larger than a pH of 6, the sound speed gradually reduces, and when the pH exceeds 8, the sound speed sharply reduces. At a pH of 9.9, the sound speed reaches a local minimum of 49 m/s. When the pH further increases, the sound speed rises.

From the above-mentioned results, it is considered that a desired porous silica material having a low sound speed can be manufactured by appropriately adjusting the pH of the aqueous solution containing the catalyst in accordance with the relationship shown in FIG. 1. Specifically, porous silica materials are produced with use of aqueous solutions each containing the catalyst and having various pH values, and the sound speeds of the manufactured porous silica materials are measured, to thereby determine in advance a relationship between the pH of the aqueous solution containing the catalyst and the sound speed of the manufactured porous silica material. Determining a required pH of the aqueous solution containing the catalyst for obtaining a porous silica material having a desired sound speed with use of the determined relationship allows the production of the porous silica material having a desired sound speed with use of the aqueous solution containing the catalyst and having the determined pH.

According to the related art, a relationship between the density and sound speed of a manufactured porous silica material is known. However, it is not known what production conditions are appropriate for obtaining a porous silica material having a desired sound speed. Accordingly, the fact that porous silica materials having different sound speeds can be obtained by adjusting the pH of the aqueous solution containing the catalyst as described above is extremely beneficial.

In this regard, however, as can be seen from FIG. 1, in the range of a pH of 8.4 to a pH of 9.9 differing by about 1.5, the sound speed significantly changes from 106 m/s to 49 m/s. Thus, even a little change in the pH of the aqueous solution containing the catalyst within the range of a pH of 8.4 to a pH of 9.9 causes the sound speed of the manufactured porous silica material to significantly change. Accordingly, it can be said that a porous silica material having a desired sound speed within the range of about 100 m/s or less is difficult to stably produce.

The inventors of the present application have further made detailed studies on this problem, and as a result, have found that the dependence of the sound speed of the porous silica material on the pH of the aqueous solution containing the catalyst can be reduced by using TMOS and diisobutyldimethoxysilane (hereinafter abbreviated as DIBDMS) as silicon alkoxides. DIBDMS has a structure represented by the following chemical formula (2).

[Chem. 2]

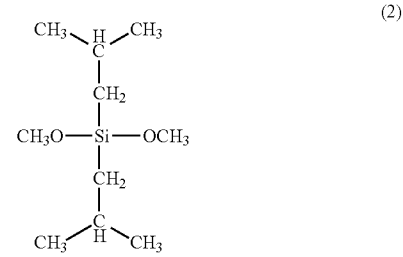

(2)

An aspect of the present invention is outlined below. A method of producing a porous silica material according to an aspect of the present invention includes: preparing a raw material solution containing silicon alkoxides including diisobutyldimethoxysilane and tetramethoxysilane in such a mass ratio that a mass of the diisobutyldimethoxysilane is 0.25 or more and 1 or less per mass of the tetramethoxysilane, and a solvent; obtaining a wet gel by adding, to the raw material solution, an aqueous solution containing a catalyst for promoting hydrolysis and condensation polymerization of the silicon alkoxides, the aqueous solution having a pH of 8.9 or more and 11.3 or less; washing the wet gel; and drying the washed wet gel under supercritical conditions.

The raw material solution contains the silicon alkoxides and the solvent in such a mass ratio that a mass of the solvent is 0.24 or more and 7.1 or less per mass of the silicon alkoxides.

The pH of the aqueous solution containing the catalyst is 9.2 or more and 10.2 or less.

The pH of the aqueous solution containing the catalyst is 8.8 or more and 11.3 or less.

The pH of the aqueous solution containing the catalyst is 8.9 or more and 10.4 or less.

The method further includes, between the drying and the washing, hydrophobizing the wet gel.

The solvent of the raw material solution includes ethanol.

The catalyst includes at least one kind selected from the group consisting of ammonia, a quaternary ammonium salt, an amine, sodium hydroxide, and potassium hydroxide.

An amount of the aqueous solution containing the catalyst is 3.5 or more and 4.5 or less per mole of the silicon alkoxides.

The obtaining of a wet gel includes holding the raw material solution having added thereto the aqueous solution containing the catalyst at a temperature of 40° C. or more and 70° C. or less.

A method of producing a porous silica material according to an embodiment of the present invention is described in detail below with reference to FIGS. 2A to 2F.

1. Preparation of Raw Material Solution

Figure 2A:
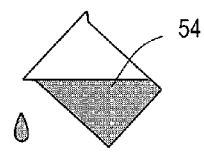
FIGS. 2A to 2F are schematic views illustrating respective steps in a method of producing a porous silica material according to an embodiment of the present invention.
Figure 2A:
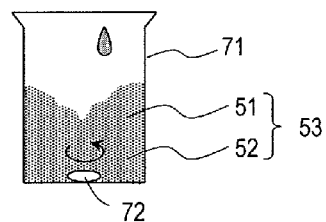

First, as illustrated in FIG. 2A, a raw material solution 53 (starting solution) in which silicon alkoxides 51 and a solvent 52 are mixed is prepared in a container 71 such as a beaker. Unlike conventional ones, the silicon alkoxides 51 contain TMOS and DIBDMS. A mixing ratio between TMOS and DIBDMS may be such that the mass of DIBDMS is 0.24 or more and 1 or less when the mass of TMOS is defined as 1. When the mass ratio of DIBDMS to TMOS is less than 0.24, the pH dependence of the sound speed does not sufficiently reduce. On the other hand, when the mass ratio of DIBDMS to TMOS is more than 1, the gelation of the silicon alkoxides 51 requires a prolonged period of time of 100 hours or more, resulting in reduced manufacturing efficiency.

The solvent 52 may be amphiphilic, that is, have hydrophilicity and lipophilicity. This is because the silicon alkoxides 51, which have hydrophobicity, hardly react with water, whereas the solation and gelation of the silicon alkoxides 51 require hydrolysis and dehydration-condensation, requiring an interaction with water. As the solvent, there is used, for example, methanol, ethanol, n-propyl alcohol, or 1-propyl alcohol. There is such a tendency that, as the molecular weight of the solvent increases, the gelation time is prolonged.

The raw material solution 53 may contain the silicon alkoxides 51 and the solvent 52 in such a mass ratio that the mass of the solvent 52 is 0.24 or more and 7.1 or less per mass of the silicon alkoxides 51. When the mass ratio of the solvent 52 is less than 0.24, it is difficult to obtain a homogeneous gel from the silicon alkoxides 51. Consequently, the porous silica material is liable to have non-uniform characteristics. In addition, when the mass ratio is more than 7.1, the gelation of the silicon alkoxides 51 requires a prolonged period of time.

2. Preparation of Aqueous Solution Containing Catalyst

When water is added to the raw material solution 53, methoxy groups ($OCH_3$) present in TMOS and DIBDMS in the silicon alkoxides 51 undergo a hydrolysis reaction to be converted to OH groups, which further undergo a dehydration-condensation reaction to form siloxane bonds (Si—O—Si bonds). In addition, the reactions can be promoted by adding a catalyst for promoting a hydrolysis reaction and a dehydration-condensation reaction to water. Therefore, in this embodiment, an aqueous solution 54 containing the catalyst is added to the raw material solution 53 to promote the hydrolysis and dehydration-condensation of the silicon alkoxides 51.

As described above, the inventors of the present application have found that the sound speed of the porous silica material can be adjusted with the pH of the aqueous solution 54 containing the catalyst. As described in detail in Examples below, the pH of the aqueous solution 54 containing the catalyst may be 8.9 or more and 11.3 or less. It has been found that, when TMOS and DIBDMS are used as the silicon alkoxides and the aqueous solution 54 that has a pH within this range is used, a porous silica material having a sound speed of 40 m/s or more and 73 m/s or less can be produced. It has also been found that, even when the pH of the aqueous solution 54 slightly varies, the sound speed of the manufactured porous silica material does not significantly change.

Although a detailed reason is not apparent, it is conceivable that the growth rate of silica particles is further retarded by mixing not only TMOS but also DIBDMS in the silicon alkoxides 51. Thus, it is conceivable that, when the pH of the aqueous solution 54 containing the catalyst is set within the above-mentioned range, the silica particles increase in size and the sound speed reduces.

Ammonia may be used as the catalyst in the aqueous solution 54. However, the catalyst is not particularly limited as long as the above-mentioned pH can be attained with the catalyst. Besides ammonia, there may be used, for example, a quaternary ammonium base such as a tetramethylammonium hydroxide solution, an amine, sodium hydroxide, or potassium hydroxide. The pH of the aqueous solution 54 is adjusted with the addition amount of the catalyst to be added to water. In addition, when the pH becomes excessively large as compared to a desired value, the pH can be reduced by adding water to the aqueous solution 54. Therefore, the addition amount of the catalyst depends on the value to which the pH of the aqueous solution 54 is to be set.

The amount of the aqueous solution 54 containing the catalyst may be 3.5 or more and 4.5 or less (number of moles of water in the aqueous solution 54 containing the catalyst) per mole of the silicon alkoxides. When the molar ratio of the aqueous solution 54 containing the catalyst is excessively small, the gelation requires a long period of time, resulting in reduced manufacturing efficiency. In addition, when the molar ratio of the aqueous solution 54 containing the catalyst is excessively large, a non-homogeneous gel is liable to be formed.

3. Manufacture of Sol/Gel

Figure 2D:
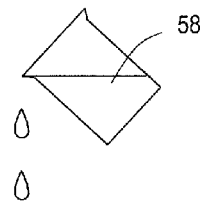
Figure 2D:
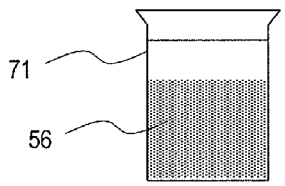
Figure 2B:
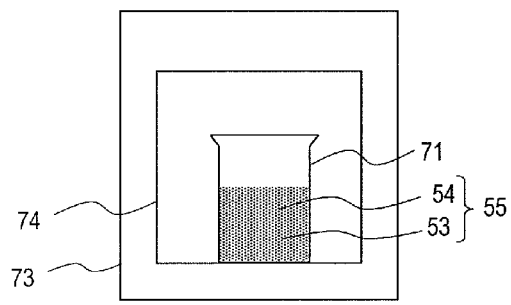

As illustrated in FIG. 2A, the raw material solution 53 is placed in the container 71, and the above-mentioned amount of the aqueous solution 54 containing the catalyst is added dropwise while the raw material solution 53 is stirred with a rotator 72 or the like. Thus, the hydrolysis reaction and condensation polymerization reaction of the silicon alkoxides 51 start, and as illustrated in FIG. 2B, a sol solution 55 is generated. The container 71 containing the sol solution 55 thus generated is placed in, for example, a hermetically closed container 74 in order to prevent the evaporation of moisture. After that, the hermetically closed container 74 is placed and held in a thermostatic chamber 73.

The temperature of the thermostatic chamber 73, that is, the temperature at which the sol solution 55 is held falls within the range of temperatures equal to or higher than room temperature and lower than the boiling point of the solvent of the raw material solution 53. A period of time of the holding is, for example, 24 hours. With this procedure, the dehydration-condensation reaction further progresses in the dehydration-condensation products of the silicon alkoxides 51 in the sol to generate a wet gel 56 in which the dehydration-condensation products of the silicon alkoxides 51 are dispersed.

The period of time required for the gelation varies depending on manufacturing conditions such as the concentration of the silicon alkoxides 51 in the raw material solution 53, the pH of the aqueous solution 54 containing the catalyst, and the temperature at which the sol solution 55 is held. It is appropriate that the temperature at which the sol solution 55 is held be set with reference to sufficient completion of the gelation within about 24 hours as a rough standard. When the solvent 52 of the raw material solution 53 is ethanol, the holding temperature may be 40° C. or more and 70° C. or less.

Figure 2E:
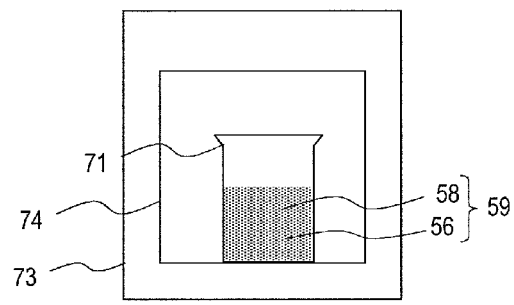
Figure 2C:
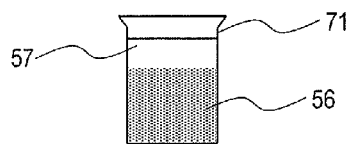
Figure 2F:
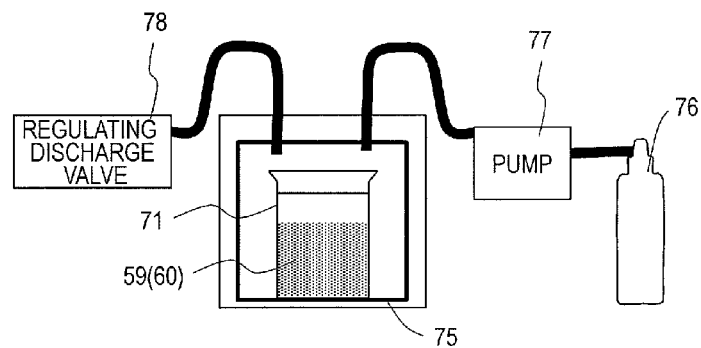

As illustrated in FIG. 2C, after that, a solvent 57 such as ethanol is poured into the container 71 holding the wet gel 56, and the wet gel 56 is washed to remove, for example, the catalyst and alcohols of the reactants. The same solvent as the solvent 52 may be used as the solvent 57.

4. Hydrophobizing Treatment

The manufactured wet gel has many hydrophilic groups (e.g., hydroxy groups). Therefore, as required, hydrophobizing treatment for substituting hydrophilic groups with hydrophobic groups may be performed. As illustrated in FIG. 2D, the hydrophobizing treatment involves adding a hydrophobizing treatment solution 58 obtained by mixing a hydrophobizing agent, a solvent, a catalyst, and water to the container 71 holding the wet gel 56 to immerse the wet gel 56 in the hydrophobizing treatment solution 58.

As the hydrophobizing agent, there may be used dimethyldimethoxysilane (hereinafter referred to as DMDMS), trimethylmethoxysilane, trimethylethoxysilane, trimethylchlorosilane, or the like. The solvent, which has only to be amphiphilic, may be, for example, ethanol. A ratio between the hydrophobizing agent and the solvent be 1:1 or the amount of the solvent may be smaller than that. The solvent may be absent (that is, 1:0). However, the hydrophobizing agent is more expensive than the solvent in many cases, and is also difficult to recycle. Accordingly, from the viewpoint of economic efficiency, the hydrophobizing agent may be diluted with the solvent before use. When the amount of the solvent is excessively large, the effect of the hydrophobizing treatment reduces. An aqueous solution containing a catalyst is added dropwise to a mixed liquid obtained by mixing the hydrophobizing agent and the solvent in a mass ratio of the mixed liquid to the aqueous solution of about 10:1, to thereby prepare the hydrophobizing treatment solution 58. The catalyst may be basic, and ammonia is preferred.

As illustrated in FIG. 2E, the wet gel 56 is immersed in the hydrophobizing treatment solution 58, and placed in the hermetically closed container 74. After that, the hermetically closed container 74 is placed and held in the thermostatic chamber 73. The temperature of the thermostatic chamber 73 falls within the range of temperatures equal to or higher than room temperature and lower than the boiling point of the solvent contained in the hydrophobizing treatment solution 58. A period of time of the holding is, for example, 24 hours. When the holding temperature is excessively low, the hydrophobization reaction does not sufficiently progress. In addition, when the holding temperature is excessively high, the solvent boils, which causes a fissure or a crack in the completed porous silica material. After the hydrophobizing treatment, as described with reference to FIG. 2C, a hydrophobized wet gel 59 may be washed with a solvent such as ethanol to remove an unreacted material and the like.

5. Drying

The hydrophobized wet gel 59 is dried in a supercritical state. The container 71 containing the wet gel is placed in a pressure-resistant drying container 75 together with the solvent. Carbon dioxide is injected from a gas cylinder 76 into the drying container 75 by using a pump 77, and brought into a pressurized state at 7.4 MPa or more. After that, under a state in which the temperature is increased to 31.1° C. or more and the pressure in the drying container 75 is increased to a constant value, carbon dioxide is caused to flow into the drying container 75. Consequently, the solvent in the container 71 is replaced with carbon dioxide, and the solvent present inside or around the wet gel 59 is also replaced with carbon dioxide.

Carbon dioxide is brought into a supercritical state at a pressure of 7.4 MPa or more and a temperature of 31.1° C. or more. The wet gel 59 may be filled with carbon dioxide in a supercritical state at a pressure of 17 MPa and a temperature of 80° C. After that, the inside of the drying container 75 is returned to normal temperature and normal pressure to gasify carbon dioxide in the supercritical state. Thus, a porous silica material 60 is obtained.

As described above, according to the method of producing a porous silica material according to this embodiment, a porous silica material having a sound speed of 40 m/s or more and 73 m/s or less can be produced by using TMOS and DIBDMS as the silicon alkoxides and setting the pH of the aqueous solution containing the catalyst for promoting the hydrolysis and condensation polymerization of the silicon alkoxides within the range of 8.9 or more and 11.3 or less. In addition, even when the pH of the aqueous solution containing the catalyst slightly varies, the sound speed of the manufactured porous silica material does not significantly change. Therefore, even when the pH of the aqueous solution containing the catalyst slightly varies, a porous silica material having a low sound speed can be stably produced.

EXAMPLES

1. Manufacture of Sample and Measurement of Characteristics

In order to verify the above-mentioned effects provided by the method of producing a porous silica material according to this embodiment, described below are results obtained by manufacturing porous silica materials under various conditions and measuring their sound speeds.

Example 1

1.1 Manufacture of Porous Silica Material

A porous silica material having a size of 10 mm×10 mm×5 mm in thickness was manufactured. First, as silicon alkoxides, commercially available TMOS (manufactured by Tokyo Chemical Industry Co., Ltd.) and commercially available DIBDMS (manufactured by Gelest, Inc.) were mixed and stirred in a container. Table 1 below shows their blending ratio (mass ratio).

TABLE 1

|  | Silicon alkoxides | |
|  | TMOS | DIBDMS |
| Example 1 | 1 | 0.25 |
|  | 1 | 0.43 |
|  | 1 | 1.00 |
| Comparative Example 1 | 1 | 0 |
| Comparative Example 2 | 1 | 0.18 |

To the mixed silicon alkoxides was added ethanol, and the whole was further stirred and mixed to manufacture a raw material solution. While the raw material solution was stirred, an aqueous solution containing ammonia as a catalyst was added dropwise to manufacture a sol solution. Table 2 shows the blending ratio (mass ratio) among the silicon alkoxides, ethanol, and ammonia water.

TABLE 2

| Silicon alkoxides | Ethanol | Ammonia water |
|---|---|---|
| 1 | 1.62 | 0.47 |

Respective types of ammonia water were manufactured by changing the pH as shown in Table 3. A method of measuring the pH is described in detail later. The ammonia water was manufactured by adding ion exchange water to a 0.1 N ammonia solution.

TABLE 3

| | pH | Density (kg/m$^3$) | Sound speed (m/s) | Amount of change |
|---|---|---|---|---|
| Example 1 (DIBDMS 0.25) | 10.4 | 122 | 60 | 10.23 |
| | 9.8 | 122 | 40 | |
| | 8.8 | 119 | 43 | |
| Example 1 (DIBDMS 0.43) | 11.3 | 120 | 73 | 11.78 |
| | 10.5 | 108 | 54 | |
| | 9.9 | 110 | 46 | |
| | 8.9 | 117 | 58 | |
| Example 1 (DIBDMS 1) | 10.2 | 78 | 52 | 10.19 |
| | 9.2 | 88 | 54 | |
| Comparative Example 1 (DIBDMS 0) | 11.3 | 171 | 92 | 20.17 |
| | 10.5 | 161 | 66 | |
| | 9.9 | 158 | 49 | |
| | 9.5 | 184 | 64 | |
| | 8.9 | 183 | 93 | |
| | 8.4 | 184 | 106 | |
| | 6.1 | 182 | 117 | |
| Comparative Example 2 (DIBDMS 0.18) | 10.2 | 128 | 58 | 32.28 |
| | 9.8 | 127 | 44 | |
| | 9.2 | 146 | 76 | |

After having been thoroughly stirred, the sol solution was poured into a mold and placed in a hermetically closed container. A sol solution that used ammonia water having a pH of 11.3 was aged in a thermostatic chamber at 40° C. for 24 hours to manufacture a wet gel. A sol solution that used ammonia water having a pH of 10.5 or less was aged in a thermostatic chamber at 70° C. for 24 hours to manufacture a wet gel.

The wet gel after the aging was transferred to a container containing fresh ethanol and washed by being immersed in the ethanol for about 24 hours.

Next, hydrophobizing treatment was performed. A hydrophobizing treatment liquid was manufactured by mixing 38 g of dimethyldimethoxysilane with 38 g of ethanol, 2.05 g of water, and 5.55 g of 1 N ammonia water as a catalyst. The wet gel was immersed in the manufactured hydrophobizing treatment liquid, and subjected to a reaction at 70° C. for about 24 hours. After the hydrophobizing treatment, the treatment liquid was discarded, and the treated gel was washed by being immersed in fresh ethanol for 24 hours. After that, supercritical drying with carbon dioxide was performed under the conditions of 17 MPa and 80° C. to afford a porous silica material as a dry gel.

1.2 Measurement of pH of Catalyst Water

The pH of ammonia water was measured with a personal pH meter (TPS-90i) manufactured by Toko Chemical Laboratories Co. Ltd. The personal pH meter has an automatic calibration function provided with automatic temperature compensation, and calibration with two points was performed before the measurement with use of attached standard solutions having a pH of 7 and a pH of 9. About 50 cc of ammonia water were taken in a beaker and subjected to the measurement at room temperature while being stirred. The measurement was performed three times, and then an average value thereof was adopted as a measured value.

Figure 3:
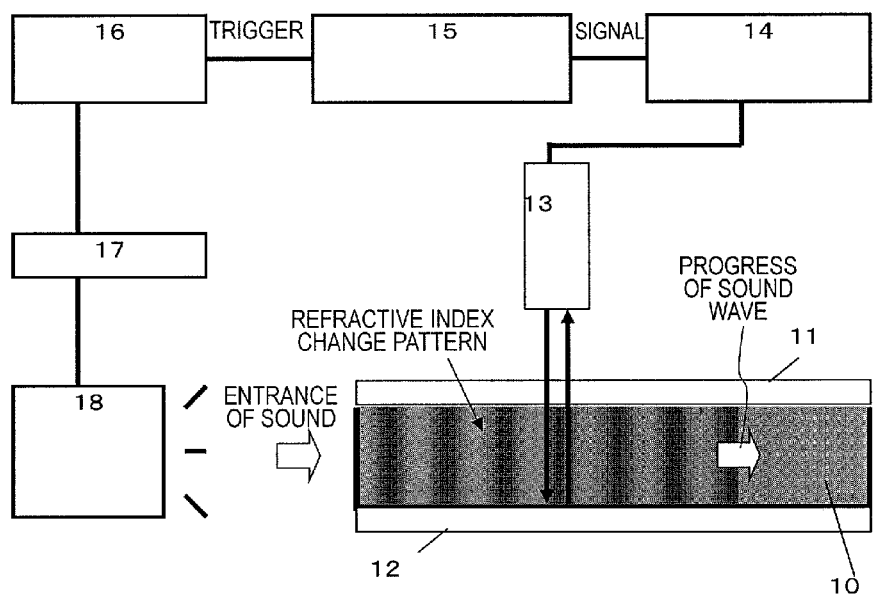
FIG. 3 illustrates a configuration of a non-contact sound speed measurement system for investigating the sound speeds of porous silica materials of Example and Comparative Examples.

1.3 Measurement of Sound Speed for Sound Wave Propagating in Manufactured Porous Silica Material The sound speed of the manufactured porous silica material was measured. First, a method of measuring the sound speed is described. FIG. 3 illustrates a configuration of a non-contact sound speed measurement system that uses a laser Doppler vibrometer (hereinafter abbreviated as LDV). As illustrated in FIG. 3, a manufactured porous silica material 10 was sandwiched and held between a transparent acrylic plate 11 that is translucent and a support 12 having a mirror surface that are provided on two opposing surfaces other than the surface through which sound waves enters. Laser light output from a head 13 (manufactured by Polytec: OFV353) of an LDV 14 (manufactured by Polytec: OFV3001) disposed on the transparent acrylic plate 11 side is transmitted through the porous silica material 10, reflected by the mirror surface of the support 12, and transmitted again through the porous silica material 10 to be returned to the LDV head 13. The LDV head 13 may be arbitrarily moved depending on a measurement point in the porous silica material 10. A signal obtained from the LDV 14 was observed with an oscilloscope 15 (manufactured by Tektronix, Inc.: TDS744A).

A burst signal formed of a single sine wave having a frequency of 40 kHz was generated with a function generator (manufactured by NF CORPORATION: 1930), the generated signal was amplified with a transmission amplifier 17 (manufactured by Pioneer Corporation: M-10X), and sound waves were generated from a tweeter 18 (manufactured by Pioneer Corporation: PT-R4) on the basis of the burst signal. The tweeter 18 was disposed at a position distant by about 210 mm from the surface of the porous silica material 5 through which sound waves entered.

A burst signal generated from the function generator 16 was also input as a trigger into the oscilloscope 15.

Figure 4:
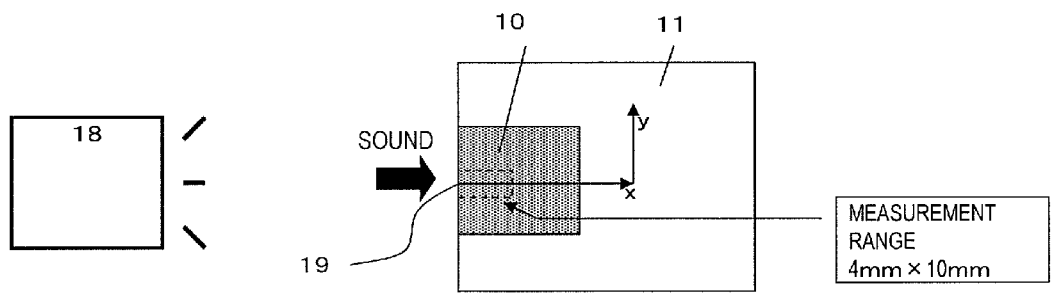
FIG. 4 illustrates a range of the porous silica material subjected to sound speed measurement in the configuration illustrated in FIG. 3.

FIG. 4 illustrates a measurement range in the non-contact sound speed measurement system illustrated in FIG. 3. FIG. 4 illustrates the porous silica material 10 seen from the head 13 side in FIG. 3. A sound wave entrance central point 19 in the porous silica material 10 is the central point of the surface of the porous silica material 10 through which sound waves enter. With the sound wave entrance central point 19 being defined as a point of origin, direction parallel to a direction in which sound waves propagate is defined as an x-direction. In addition, a direction perpendicular to the direction in which sound waves propagate is defined as a y-direction. In the range of 10 mm in the x-direction and ±2 mm in the y-direction from the sound wave entrance central point 19, measurement was performed by transmitting laser light at a pitch of 0.2 mm.

Figure 5:
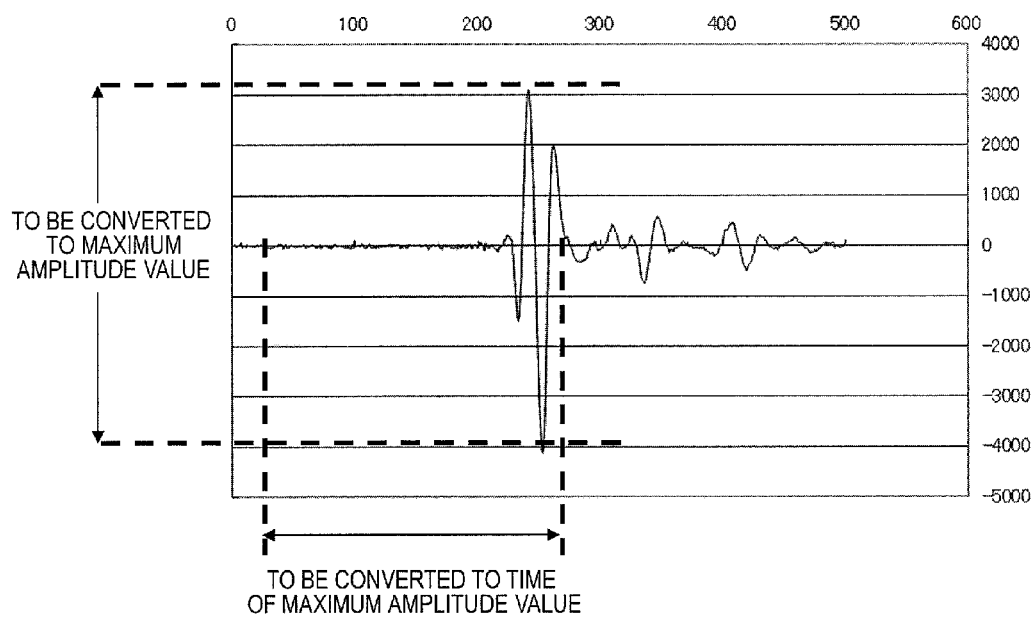
FIG. 5 shows one example of a waveform observed with an oscilloscope in the configuration illustrated in FIG. 3.

FIG. 5 shows results of observing an output temporal waveform, which was measured with the LDV, with the oscilloscope 15 at one arbitrary point in the porous silica material 10 in the case of inputting a pulsed sound wave signal. In FIG. 5, the horizontal axis represents the measurement time of the oscilloscope 15 and the vertical axis represents the amplitude of the detected signal (average value of 50 times). On the basis of the period of time required for the observed signal to reach the maximum amplitude, the period of time elapsed since the burst wave was generated from the tweeter 18 can be calculated, and can be converted into the velocity v of a sound wave measured with the head 13. In addition, the vertical axis can be converted to the amplitude of the sound wave.

Figure 6:
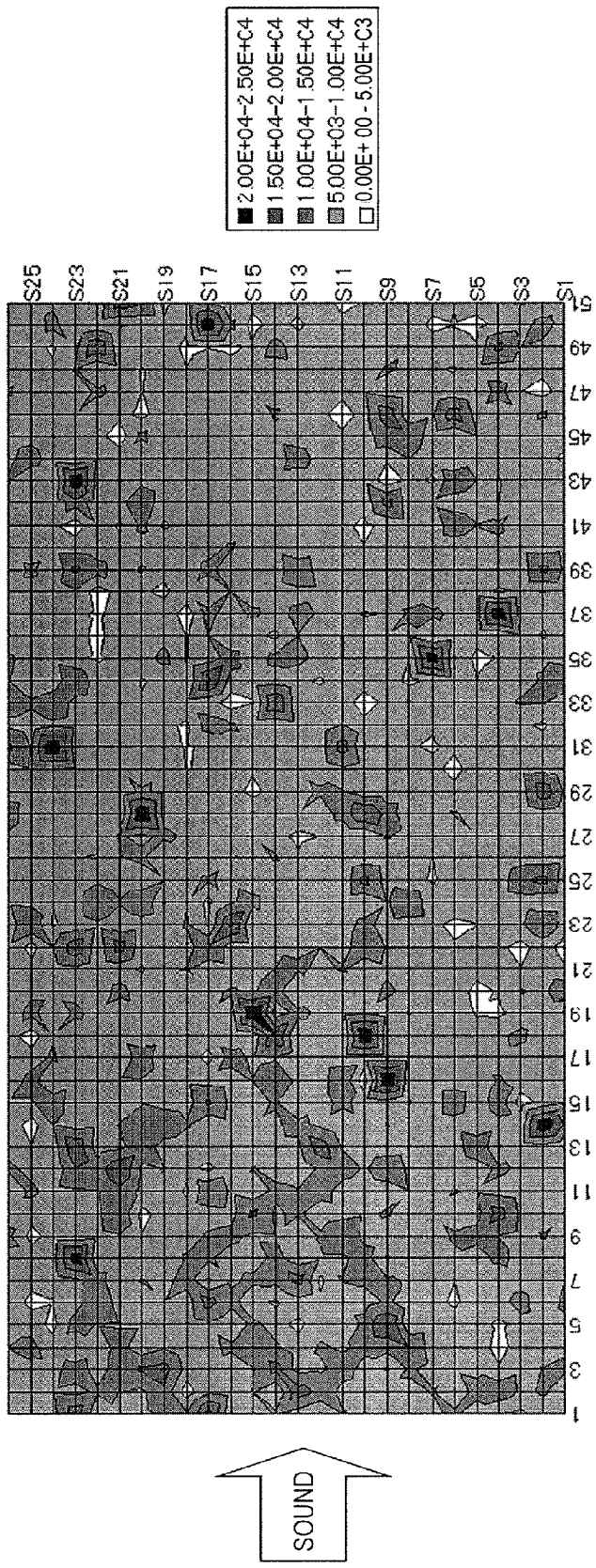
FIG. 6 shows one example a map showing measurement results obtained with the configuration illustrated in FIG. 3 in terms of maximum amplitude values.

FIG. 6 is a diagram obtained by mapping maximum amplitude values at respective measurement points measured at a pitch of 0.2 mm in the measurement range. In FIG. 6, a sound wave enters from the left side. Lightness and darkness in color indicate how large a maximum amplitude value is. A portion with a darker color has a larger amplitude value, and a portion with a lighter color has a smaller amplitude value. It is found from FIG. 6 that lightness and darkness in color are distributed independent of the measurement points (positions).

Figure 7:
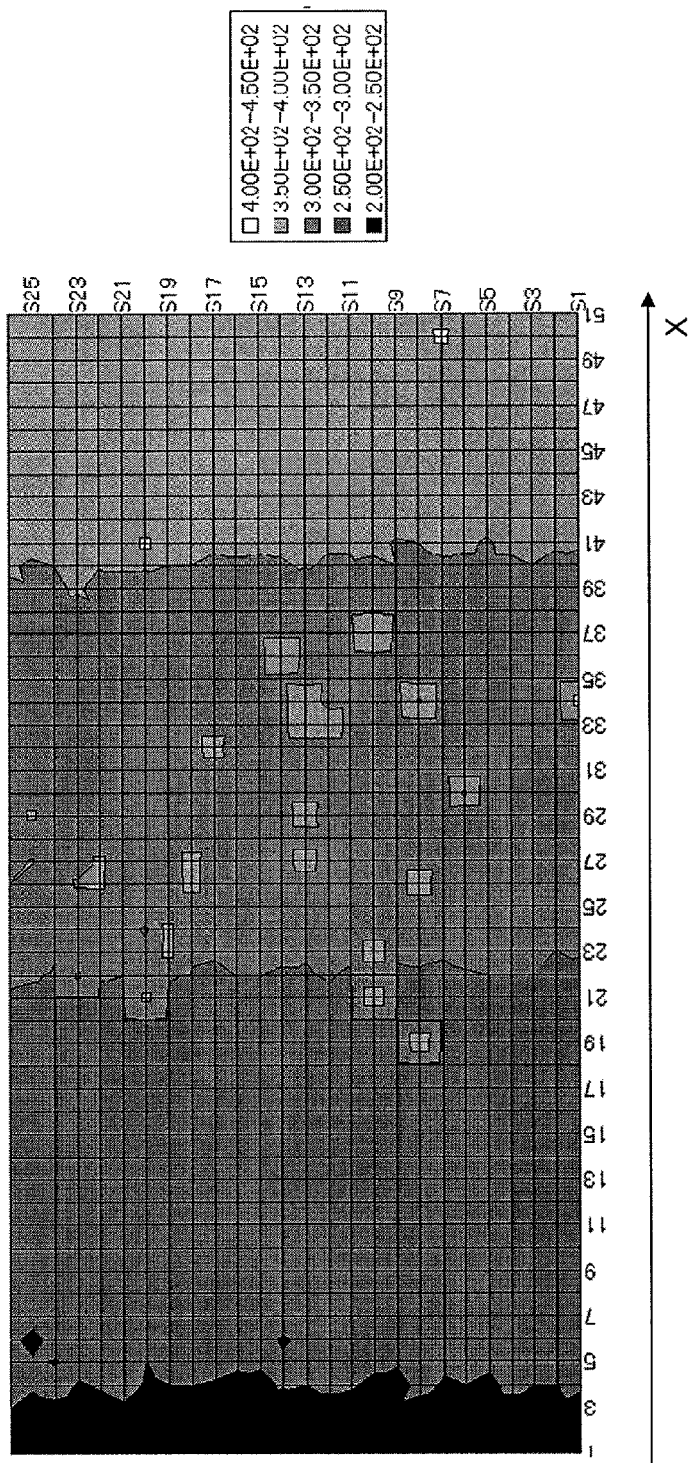
FIG. 7 shows one example of a map showing measurement results obtained with the configuration illustrated in FIG. 3 in terms of times of the maximum amplitude values.

FIG. 7 is a diagram obtained by mapping times at which the maximum amplitude values at the respective measurement points were obtained. It is found from FIG. 7 that the times at which the maximum amplitude values were measured are nearly constant in the y-axis direction, and change with increasing distance from the tweeter 18 in the x-axis direction. This indicates that sound waves propagate in parallel to the y-axis direction. It is found from FIG. 6 and FIG. 7 that most of the sound waves that have entered the porous silica material 10 propagate as plane waves in the porous silica material 10 in the measurement range.

Figure 8:
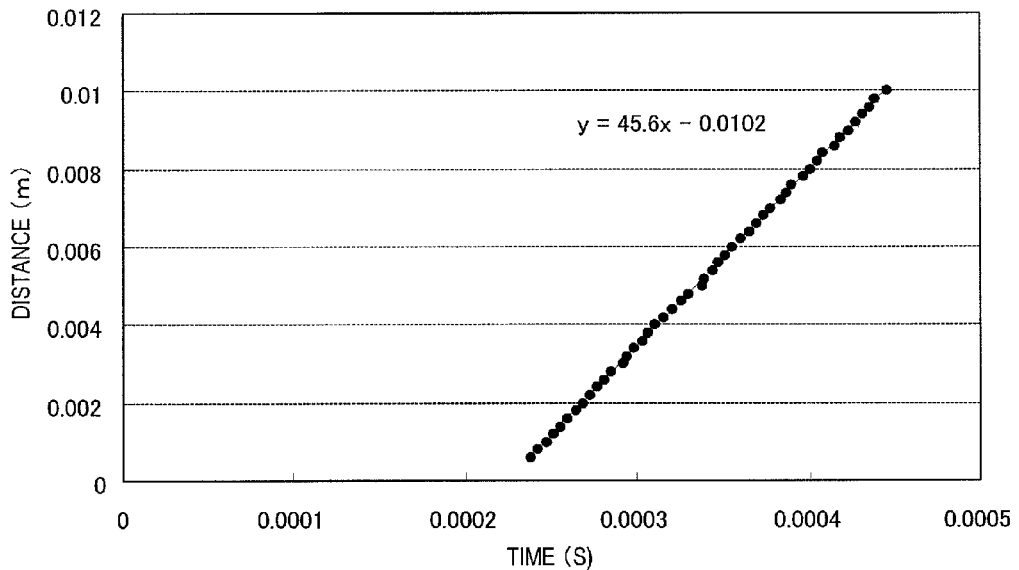
FIG. 8 shows one example of a graph for determining a sound speed, showing measurement results obtained with the configuration illustrated in FIG. 3.

FIG. 8 shows results of measurement performed at a pitch of 0.2 mm on a straight line distant by 10 mm in the x-direction from the sound wave entrance central point 19 and parallel to the y-axis. In the figure, the vertical axis represents a distance from the sound wave entrance central point 19 to the measurement point, and the horizontal axis represents a time at which the maximum amplitude value was obtained. The slope of the graph corresponds to the sound speed. FIG. 8 shows results of measurement performed for the porous silica material of Example 1 having a density of 110 kg/m³. The measurement results were approximated with a straight line, and its slope was determined. The slope indicates that the sound speed is about 46 m/s.

Figure 9:
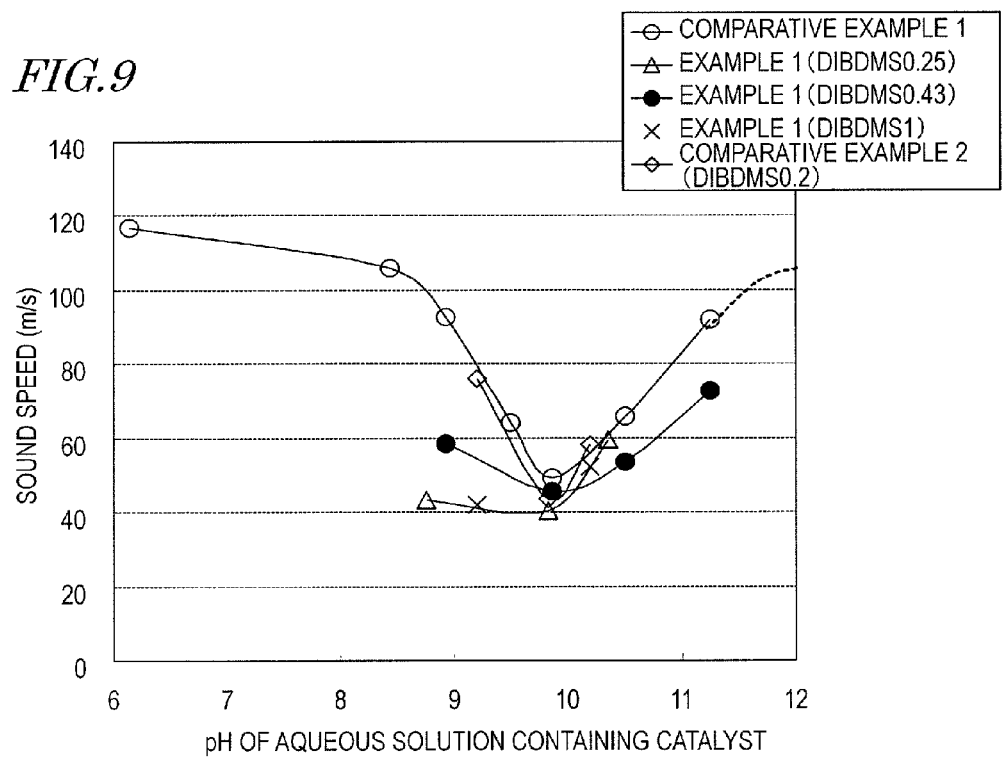
FIG. 9 is a graph showing a relationship between the sound speed of each of porous silica materials of Example 1 and Comparative Examples 1 and 2 and the pH of an aqueous solution containing a catalyst for hydrolysis and dehydration-condensation reactions.
Figure 10:
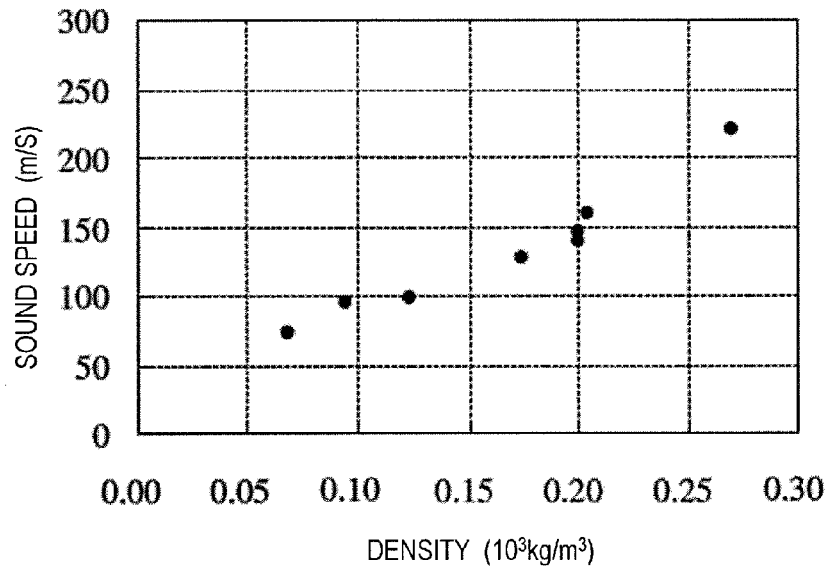
FIG. 10 shows a relationship between the density and sound speed of a porous silica material, disclosed in Non-patent Document No. 1.
Figure 11:
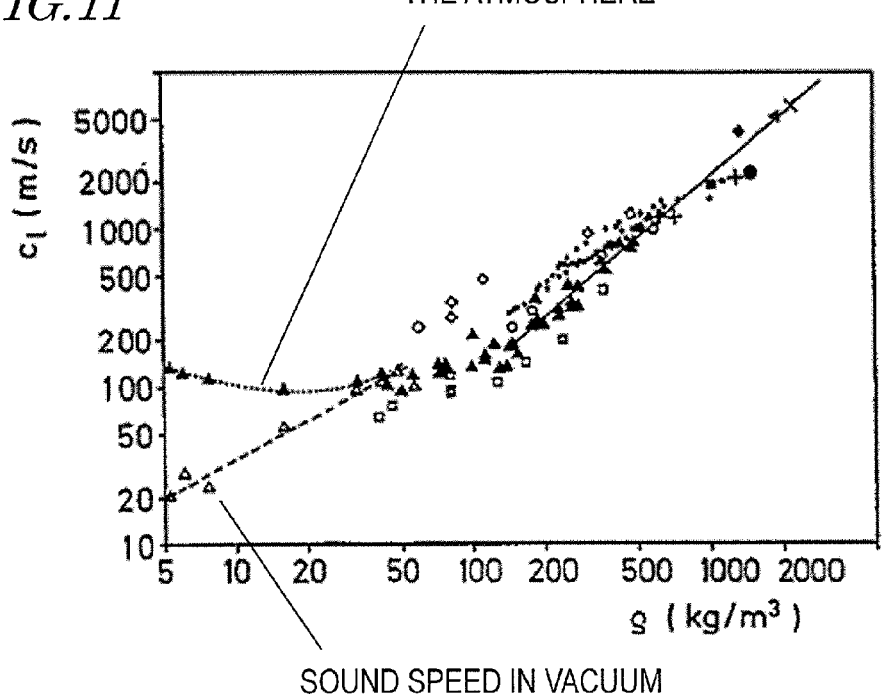
FIG. 11 shows a relationship between the density and sound speed of a porous silica material, disclosed in Non-patent Document No. 2.

Table 3 shows the density and sound speed characteristics of the porous silica materials manufactured in Example 1. In addition, FIG. 9 shows a graph in which the horizontal axis represents the pH of the catalyst water and the vertical axis represents the sound speed.

Comparative Example 1

A porous silica material was manufactured with use of only TMOS as the silicon alkoxide (100%), and was defined as Comparative Example 1. The characteristics of the obtained sample were compared to those of Example 1. Table 1 shows the blending ratio (mass ratio) of the silicon alkoxide. The blending ratio (mass ratio) among the silicon alkoxide, ethanol, and ammonia water is, as shown in Table 2, the same as that in Example 1. As shown in Table 3, samples were manufactured using seven kinds of ammonia water having different pH values and with the same materials and by the same manufacturing method as those of Example 1 except for the foregoing. The manufactured samples of Comparative Example 1 were each measured for its density and sound speed. Table 3 shows the results. In addition, FIG. 9 shows a graph (open circles) in which the horizontal axis represents the pH of the catalyst water and the vertical axis represents the sound speed.

Comparative Example 2

A porous silica material was manufactured with the same blending ratios and materials by the same manufacturing method as those of Example 1 except for changing the mixing ratio between TMOS and DIBDMS of Example 1, and was defined as Comparative Example 2. Table 3 shows the mixing ratio between TMOS and DIBDMS and the pH of ammonia water. The manufactured samples of Comparative Example 2 were each measured for its density and sound speed. Table 3 shows the results. In addition, FIG. 9 shows a graph (open squares) in which the horizontal axis represents the pH of the catalyst water and the vertical axis represents the sound speed.

Comparative Example 3

A porous silica material was manufactured with the same blending ratios and materials by the same manufacturing method as those of Example 1 except for changing TMOS out of the silicon alkoxides of Example 1 to tetraethoxysilane (hereinafter abbreviated as TEOS) represented by the following chemical formula (3), and was defined as Comparative Example 3. Ammonia water used was one having a pH of 10.5. However, the sol solution did not undergo gelation even when aged at 70° C. for 24 hours. Therefore, the aging time was further prolonged, but even at an aging time of 50 hours, gelation did not occur. Hence, the manufacture was not continued any further.

[Chem. 3]

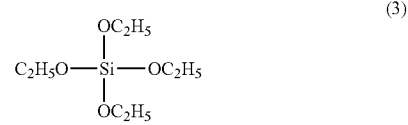

(3)

2. Discussion

Table 3 collectively shows the pH of the aqueous solution containing the catalyst used in the production of each of the porous silica materials of Example and Comparative Examples, and the densities and sound speeds of the obtained porous silica materials. In addition, on the basis of the sound speeds of the porous silica materials of Example and Comparative Examples obtained with use of aqueous solutions each containing the catalyst and having different pH values, an amount of change in sound speed when the pH changes by 1 was determined. Specifically, there was determined a value obtained by dividing a difference between the maximum value and minimum value of the sound speeds of the porous silica materials obtained in a pH range of 8.9 to 11.3 by the pH difference (11.3-8.9). For example, in Example 1 containing DIBDMS in a ratio of 0.43, the value is (73-46)/(11.3-8.9) =11.78. When there was no sample using an aqueous solution containing the catalyst and having a pH of 11.3 or 8.9, the sound speed in the case of a pH of 11.3 or 8.9 was determined from the graph shown in FIG. 9, and then the amount of change was calculated.

According to the relationship between the pH of the aqueous solution containing the catalyst and the sound speed of the manufactured porous silica material shown in Table 3 and FIG. 9, in the samples of any one of Example 1 and Comparative Examples 1 and 2, the value of the sound speed with respect to the pH shows a similar tendency. In particular, irrespective of the materials used as the silicon alkoxides and the mixing ratio therebetween, at a pH of around 9.8 or 9.9, the sound speed becomes lowest. In addition, in the case of adding DIBDMS as the silicon alkoxide in such a mass ratio that the mass of DIBDMS is 0.25 or more and 1 or less per mass of TMOS, the sound speed is reduced at any pH as compared to the case of using only TMOS (Comparative Example 1).

Those results have revealed that, according to the production method according to this embodiment, a porous silica material having a lower sound speed than that of a conventional one can be produced even under the same pH condition, by adding DIBDMS in such a mass ratio that the mass of DIBDMS is 0.25 or more and 1 or less per mass of TMOS.

In addition, as can be seen from FIG. 9, the change in sound speed with respect to the change in pH is slowed by adding DIBDMS within the above-mentioned range to TMOS. As apparent from Table 3, as compared to Comparative Examples, in Example, the amount of change in sound speed when the pH changes by 1 is about a half. That is, the pH dependence is lessened. In addition, as shown in Table 3, according to, for example, Comparative Example 1, when the pH of the aqueous solution containing the catalyst varies from 8.9 to 10.5 in the production of the porous silica material, the sound speed of the porous silica material to be obtained varies from 49 m/s to 93 m/s. In contrast, in the case of Example 1, in which DIBDMS is added in such a mass ratio that the mass of DIBDMS is 0.25 per mass of TMOS, even when the pH varies from 8.8 to 10.4, the sound speed of the porous silica material to be obtained varies only within the range of 40 m/s to 60 m/s. These results have revealed that, according to the production method according to this embodiment, when TMOS and DIBDMS are used as the silicon alkoxides and the pH of the aqueous solution containing the catalyst for promoting the hydrolysis and condensation polymerization of the silicon alkoxides falls within the range of 8.9 or more and 11.3 or less, even if the pH of the aqueous solution containing the catalyst slightly varies, the sound speed of the manufactured porous silica material does not significantly change, and hence a porous silica material having a low sound speed can be stably produced.

In particular, when TMOS and DIBDMS are used as the silicon alkoxides in such a mass ratio that the mass of DIBDMS is 0.43 per mass of TMOS, such effect can be obtained in the pH range of 8.9 to 11.3.

Further, when TMOS and DIBDMS are used as the silicon alkoxides in such a mass ratio that the mass of DIBDMS is 0.25 or more and 1 or less per mass of TMOS, such effect can be obtained in the pH range of 9.2 to 10.2 or 8.8 to 11.3.

Further, when TMOS and DIBDMS are used as the silicon alkoxides in such a mass ratio that the mass of DIBDMS is 0.25 or more and 0.43 or less per mass of TMOS, such effect can be obtained in the pH range of 8.9 to 10.4.

Although a detailed reason why such effect is obtained is not apparent, a possible reason is as described below. DIBDMS has two out of the four bonding sites of silicon substituted with alkyl groups, and hence is less likely to form siloxane bonds through hydrolysis and dehydration-condensation reactions as compared to TMOS. Consequently, the growth rate of silica particles is retarded, and the silica particles increase in size.

In addition, in Comparative Example 3, no porous silica material could be manufactured. Although a cause for this is not apparent, it is conceivable that, because of such a tendency that as the molecular weight of an alkoxy group is larger, the gelation reaction progresses to a less degree, the generation of siloxane bonds in the silicon alkoxides did not sufficiently progress, with the result that gelation did not occur.

The porous silica material of the present invention is suitably used as an acoustic propagation medium for various acoustic devices and photoacoustic devices. The porous silica material is particularly useful as an acoustic matching layer.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A method of producing a porous silica material, comprising:
   preparing a raw material solution containing
      silicon alkoxides including diisobutyldimethoxysilane and tetramethoxysilane in such a mass ratio that a mass of the diisobutyldimethoxysilane is 0.25 or more and 1 or less per mass of the tetramethoxysilane, and
      a solvent;
   obtaining a wet gel by adding, to the raw material solution, an aqueous solution containing a catalyst for promoting hydrolysis and condensation polymerization of the silicon alkoxides, the aqueous solution having a pH of 8.9 or more and 11.3 or less;
   washing the wet gel; and
   drying the washed wet gel under supercritical conditions.

2. The method of producing a porous silica material according to claim 1, wherein the raw material solution contains the silicon alkoxides and the solvent in such a mass ratio that a mass of the solvent is 0.24 or more and 7.1 or less per mass of the silicon alkoxides.

3. The method of producing a porous silica material according to claim 1, wherein the pH of the aqueous solution containing the catalyst is 9.2 or more and 10.2 or less.

4. The method of producing a porous silica material according to claim 1, wherein the pH of the aqueous solution containing the catalyst is 8.8 or more and 11.3 or less.

5. The method of producing a porous silica material according to claim 1, wherein the pH of the aqueous solution containing the catalyst is 8.9 or more and 10.4 or less.

6. The method of producing a porous silica material according to claim 1, further comprising, between the drying and the washing, hydrophobizing the wet gel.

7. The method of producing a porous silica material according to claim 1, wherein the solvent of the raw material solution comprises ethanol.

8. The method of producing a porous silica material according to claim 1, wherein the catalyst comprises at least one kind selected from the group consisting of ammonia, a quaternary ammonium salt, an amine, sodium hydroxide, and potassium hydroxide.

9. The method of producing a porous silica material according to claim 1, wherein an amount of the aqueous solution containing the catalyst is 3.5 or more and 4.5 or less per mole of the silicon alkoxides.

10. The method of producing a porous silica material according to claim 1, wherein the obtaining a wet gel comprises holding the raw material solution having added thereto the aqueous solution containing the catalyst at a temperature of 40° C. or more and 70° C. or less.

* * * * *